United States Patent
Huang

(10) Patent No.: US 10,814,294 B1
(45) Date of Patent: Oct. 27, 2020

(54) PIVOTAL RIGID VORTEX SHIELD

(71) Applicant: Aeration Industries International, LLC, Chaska, MN (US)

(72) Inventor: Jing Huang, Chaska, MN (US)

(73) Assignee: Aeration Industries International, LLC., Chaska, MN (US)

( * ) Notice: Subject to any disclaimer, the term of this patent is extended or adjusted under 35 U.S.C. 154(b) by 253 days.

(21) Appl. No.: 16/025,946

(22) Filed: Jul. 2, 2018

Related U.S. Application Data

(60) Provisional application No. 62/527,883, filed on Jun. 30, 2017.

(51) Int. Cl.
*B01F 7/00* (2006.01)
*B01F 3/04* (2006.01)
*C02F 3/20* (2006.01)

(52) U.S. Cl.
CPC ...... *B01F 7/00341* (2013.01); *B01F 3/04595* (2013.01); *C02F 3/207* (2013.01); *B01F 2215/0052* (2013.01)

(58) Field of Classification Search
CPC .............. B01F 3/04595; B01F 7/00341; B01F 2215/0052; C02F 3/207
USPC .................................................... 261/87, 91
See application file for complete search history.

(56) References Cited

U.S. PATENT DOCUMENTS

| | | |
|---|---|---|
| 4,240,990 A | 12/1980 | Inhofer et al. |
| 4,280,911 A | 7/1981 | Durda et al. |
| 4,741,825 A | 5/1988 | Schiller |
| 4,741,870 A | 5/1988 | Gross |
| 4,774,031 A | 9/1988 | Schurz |
| 4,806,251 A | 2/1989 | Durda |
| 4,844,816 A | 7/1989 | Fuchs et al. |
| 4,844,843 A | 7/1989 | Rajendren |
| 4,909,936 A * | 3/1990 | Arbisi ................. B01F 3/04595 210/220 |
| 4,954,295 A | 9/1990 | Durda |
| 5,942,161 A * | 8/1999 | Pate .................... B01F 3/04765 210/222 |
| 5,948,326 A * | 9/1999 | Pate .................... B01F 3/04765 210/242.2 |
| 6,022,476 A * | 2/2000 | Hausin ................. B01F 3/0412 210/150 |
| 6,824,124 B2 | 11/2004 | Henley |
| 7,172,177 B2 | 2/2007 | Durda |
| 9,675,942 B1 | 6/2017 | List et al. |

\* cited by examiner

*Primary Examiner* — Charles S Bushey
(74) *Attorney, Agent, or Firm* — Albert W. Watkins

(57) ABSTRACT

A pivotal rigid vortex shield configured for use in combination with a propeller-type aerator has a vortex shield, and a rigid support affixing the vortex shield to a support system. The support has a horizontal support bar with at least two cross arches, first and second vertical pivot and locking members, and a top arch affixed between. A pintle couples the support to vortex shield, and defines a pivotal axis about which the vortex shield is configured to rotate. A locking member may be at least one quick release pin that in an operational configuration simultaneously passes through at least a portion of at least one of the vertical pivot and locking members and at least a portion of the vortex shield support to prevent rotation of the vortex shield about the pintle. In a service configuration the pin is removed to permit the vortex shield to rotate.

16 Claims, 4 Drawing Sheets

PIVOTAL RIGID VORTEX SHIELD

CROSS REFERENCE TO RELATED APPLICATIONS

The present application claims the benefit of U.S. provisional patent application 62/527,883 filed Jun. 30, 2017 of like title and inventorship, the teachings and entire contents which are incorporated herein by reference.

BACKGROUND OF THE INVENTION

1. Field of the Invention

The present invention pertains generally to a gas and liquid contact apparatus used to aerate a liquid, for exemplary purposes as may be used for oxidation, purification, or separation within the liquid. More particularly, the present invention pertains to an apparatus for reducing or preventing the formation of vortices in a liquid adjacent to a submerged aerating propeller during an aeration process.

2. Description of the Related Art

In biological purification of waste waters which contain organic solids, sediments are formed which are so firm that anaerobic zones occur within them. This leads to the creation of offensive odors and sedimentation. Dissolved oxygen is required to prevent the formation of these offensive odors and to biologically break down the organic matter within the water. Moreover, a certain amount of dissolved oxygen is required to sustain various aquatic organisms. Increasing the dissolved oxygen content of other substances, such as sludge, is also necessary.

Aeration processes are utilized in the treatment of fluid for the purpose of mixing and increasing the dissolved oxygen (DO) content of the fluid. When used in a waste water treatment process, bacteria and other micro-organisms are supplied with oxygen to breakdown organic matter within the waste water in a purification process. In other applications, aeration processes are used in the treatment of water to meet the dissolved oxygen requirements for supporting fish and other aquatic organisms, in aquaculture, for example.

Aeration apparatuses include surface aerators, diffuser/blowers, and rotor aerators. Surface aerators pump water upward and throw water into the air. In blower/diffuser systems, forced air is introduced through diffusers at the bottom of a basin. Rotor aerators consist of rotating aerators positioned at the surface of the water receiving treatment. They cast water into the air, creating an aerosol environment.

Another type of aeration apparatus is an aspirator type aerator. These devices use an electrical motor driven rotating propeller disposed below the surface of the substance being treated. The propeller imparts a directed fluid flow over an air injection port, thereby producing an area of reduced pressure that draws in atmospheric air from an intake port through a draft tube and discharges it into the substance, e.g., the waster water being treated or the water containing marine life. Aspirator type aerators may be operated at some angle between horizontal and vertical, creating a more horizontal flow pattern within a treatment basin. This enables this type of apparatus to adequately mix the liquid in a basin, preventing build-up along the bottom and sides of the basin. In addition, with adequate mixing, the oxygenation within a treatment basin is much more even and consistent than with other types of aeration apparatus. There are two benefits of even oxygenation. The first is of course that the liquid being treated may then be better controlled, or in other words just the right amount of oxygen may be introduced throughout, rather than having too much oxygen adjacent to the aeration equipment and too little in other areas. The other benefit of even oxygenation is a reduced amount of energy required to obtain adequate oxygenation. When a local region is overly oxygenated, less of the oxygen from the air source will diffuse, requiring more effort to put the oxygen in and lowering the overall oxygenation efficiency for a given amount of energy input.

Exemplary U.S. patents conceived and developed by the present assignee illustrating aspirator type aeration apparatus, the teachings which are incorporated herein by reference, include: U.S. Pat. No. 4,240,990 by Inhofer et al, entitled "Aeration propeller and apparatus"; U.S. Pat. No. 4,280,911 by Durda et al, entitled "Method for treating water"; U.S. Pat. No. 4,741,825 by Schiller, entitled "Mobile vortex shield"; U.S. Pat. No. 4,774,031 by Schurz, entitled "Aerator"; and U.S. Pat. No. 4,806,251 by Durda, entitled "Oscillating Propeller Type Aerator Apparatus and Method".

Apparatus may also be provided that incorporates a blower to force the air into the liquid, rather than solely relying upon aspiration. Exemplary U.S. patents, several of which were conceived and developed by the present assignee, the teachings which are incorporated herein by reference, include: U.S. Pat. No. 4,741,870 by Gross, entitled "Apparatus for Treatment of Liquids"; U.S. Pat. No. 4,844,816 by Fuchs et al, entitled "Method of Aeration at Specific Depth and Pressure Conditions"; U.S. Pat. No. 4,844,843 by Rajendren, entitled "Waste Water Aerator having Rotating Compression Blades"; and U.S. Pat. No. 4,954,295 by Durda, entitled "Propeller Aerator with Peripheral Injection of Fluid and Method of Using the Aerator".

As is apt to happen with subsurface propeller-type devices, vortices are created. In the context of an aeration apparatus, vortices are undesirable as they decrease the speed and efficiency of operation. In addition, vortices also introduce undesirable and consequential vibration to the operational units and lead to pre-mature mechanical failure. To combat these problems, vortex shields have been developed for aerators. These shields prevent the formation of vortices adjacent the propeller in the liquid in which the propeller is driven.

In some prior art embodiments of vortex shields, the shield is rigidly affixed to the aerator so as to reside, in part, above the aerator propeller when the aerator is in operation. These shields are either flat or curved around the aerator shaft. Exemplary U.S. patents already incorporated herein above by reference, include: U.S. Pat. No. 4,240,990 by Inhofer et al, entitled "Aeration propeller and apparatus"; and U.S. Pat. No. 4,280,911 by Durda et al, entitled "Method for treating water".

These aerator-affixed vortex shields have a number of disadvantages. They tend to catch a disproportionate amount of material suspended in the water. This is because they are adjacent to the source of greatest movement and flow within a treatment liquid. Since the shields are disposed under the surface of the water, it is difficult, if not impossible to locate any problems with the shield, or to clean the shield. The shields also are not able to eliminate every vortex created. Often a vortex forms in a non-vertical direction immediately adjacent to the impeller, and can thereby evade the also adjacent vortex shield. Also when a vortex escapes the shield it sometimes vibrates the shield and tears it off.

In consideration of the foregoing limitations, several additional patents illustrate an alternative vortex shield suspended from a support structure floating on the surface of the aerated substance. An exemplary U.S. patent, the teachings which are incorporated herein by reference, is U.S. Pat. No. 6,824,124 by Henley, entitled "Aerator and mixer". Unfortunately, the Henley vortex shield is rigidly affixed below the liquid surface, and so cannot be inspected or cleaned without working below the surface of the liquid or removing the entire aeration apparatus from the liquid. Neither are desirable or practical in many applications.

The present assignee has also conceived and developed a vortex shield that is suspended by flexible, elongate members from a support structure adjacent to or floating on the surface of the aerated substance. Exemplary U.S. patents, the teachings which are incorporated herein by reference, include U.S. Pat. No. 4,741,825 by Schiller, entitled "Mobile vortex shield" and U.S. Pat. No. 7,172,177 by Durda, entitled "Aerator". The flexible, elongate members allow the shield to float over a defined surface area of the aerated substance above the aerator's propeller. In addition, the flexible cables do not interfere with the lifting of the vortex shield from the liquid. In some applications this has solved many of the problems of the prior art. However, the flexible cables also allow the vortex shield to move about in the liquid, meaning that in some circumstances the shield will fail to function properly, may still allow the formation of a vortex, and may even move a float or other supporting structure about.

Regardless of the type of vortex shield illustrated in the prior art, these vortex shields tend to collect and accumulate solid material suspended in the liquid being treated and circulated. For exemplary and non-limiting purpose, rags, twigs, sludge, and other debris can collect both on the edges and surfaces of the vortex shield. This debris can interfere with proper fluid circulation, and in extreme cases can interfere with either the proper operation of the shield or the aerator itself.

As may be apparent, in spite of the enormous advancements and substantial research and development that has been conducted, there still remain many situations and much need for a vortex shield, but which unlike the prior art may be more readily inspected and cleaned and yet which will maintain proper position during normal operation.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is, in combination, a propeller-type aerator and a pivotal rigid vortex shield. The propeller-type aerator has a propeller adapted to impel a liquid; a motor driving the propeller; a gas source configured to introduce a gas into the liquid; and a support system configured to support at least the motor and propeller relative to the liquid. The pivotal rigid vortex shield comprises a vortex destroying body; a support affixing said vortex destroying body to said support system; a pivotal axis about which the support and vortex destroying body are configured to rotate; and at least one selective lock having an operational configuration preventing a rotation of the vortex destroying body about the pivotal axis and having a service configuration permitting the vortex destroying body to rotate about the pivotal axis.

In a second manifestation, the invention is a pivotal rigid vortex shield supported upon a supporting apparatus. A vortex destroying body is affixed to the supporting apparatus through a support. A pintle is provided, about which the vortex destroying body is configured to rotate relative to the support.

In a third manifestation, the invention is, in combination, a propeller-type aerator and a pivotal rigid vortex shield. The propeller-type aerator has a propeller adapted to impel a liquid; a motor driving the propeller; an air source configured to introduce air into the liquid; and a support system configured to support at least the motor and propeller relative to the liquid. The pivotal rigid vortex shield comprises a rigid, generally planar vortex destroying body; and a support affixing the vortex destroying body to the support system. The support has a horizontal support bar comprising at least two cross arches and at least one vertical pivot and a locking member affixed to at least one of the at least two cross arches. The at least one vertical pivot and locking member has a first vertical pivot and locking member, a second vertical pivot and locking member, and a top arch affixed on a first position to the first vertical pivot and locking member and on a second position distal to the first position to the second vertical pivot and locking member. A pintle defines a pivotal axis about which the support and vortex destroying body are configured to rotate. At least one selective lock has an operational configuration preventing a rotation of the vortex destroying body about the pivotal axis and has a service configuration permitting the vortex destroying body to rotate about the pivotal axis.

OBJECTS OF THE INVENTION

Exemplary embodiments of the present invention solve inadequacies of the prior art by providing a vortex shield that in a first operational configuration is locked into position between the impeller of a liquid aerator and the surface of the liquid, and in a second service configuration is pivotal about a supporting structure, to permit the vortex shield to be pivoted out of the liquid for cleaning and service.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a vortex shield suitable for use with liquid aerators that is operative to prevent the formation of vortices adjacent the propeller in the liquid in which the propeller is driven. A second object of the invention is to provide a vortex shield intermediate between the aerator impeller and the liquid surface, to most effectively prevent the formation of a vortex and to also be located in a lower-flow region displaced from the impeller, so as to collect less entrained debris. Another object of the present invention is to provide a vortex shield that may be more readily inspected and cleaned. A further object of the invention is to provide a vortex shield that may be pivoted. Yet another object of the present invention is to provide a vortex shield that has a first operational configuration locked into position between the impeller of a liquid aerator and the surface of the liquid, and a second service configuration pivotal about a supporting structure to permit the vortex shield to be pivoted out of the liquid for cleaning and service. An additional object of the invention is the provision of a vortex shield rigidly affixed to a support such as a float, which will ensure that proper shield position is maintained, while still enabling the vortex shield to be readily raised from the liquid.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment, the present invention provides a vortex shield that in a first operational configuration is locked into position between the impeller of a liquid aerator and the surface of the liquid, and in a second service configuration is pivotal about a supporting structure, to permit the vortex shield to be pivoted out of the liquid for cleaning and service.

Figure 1:
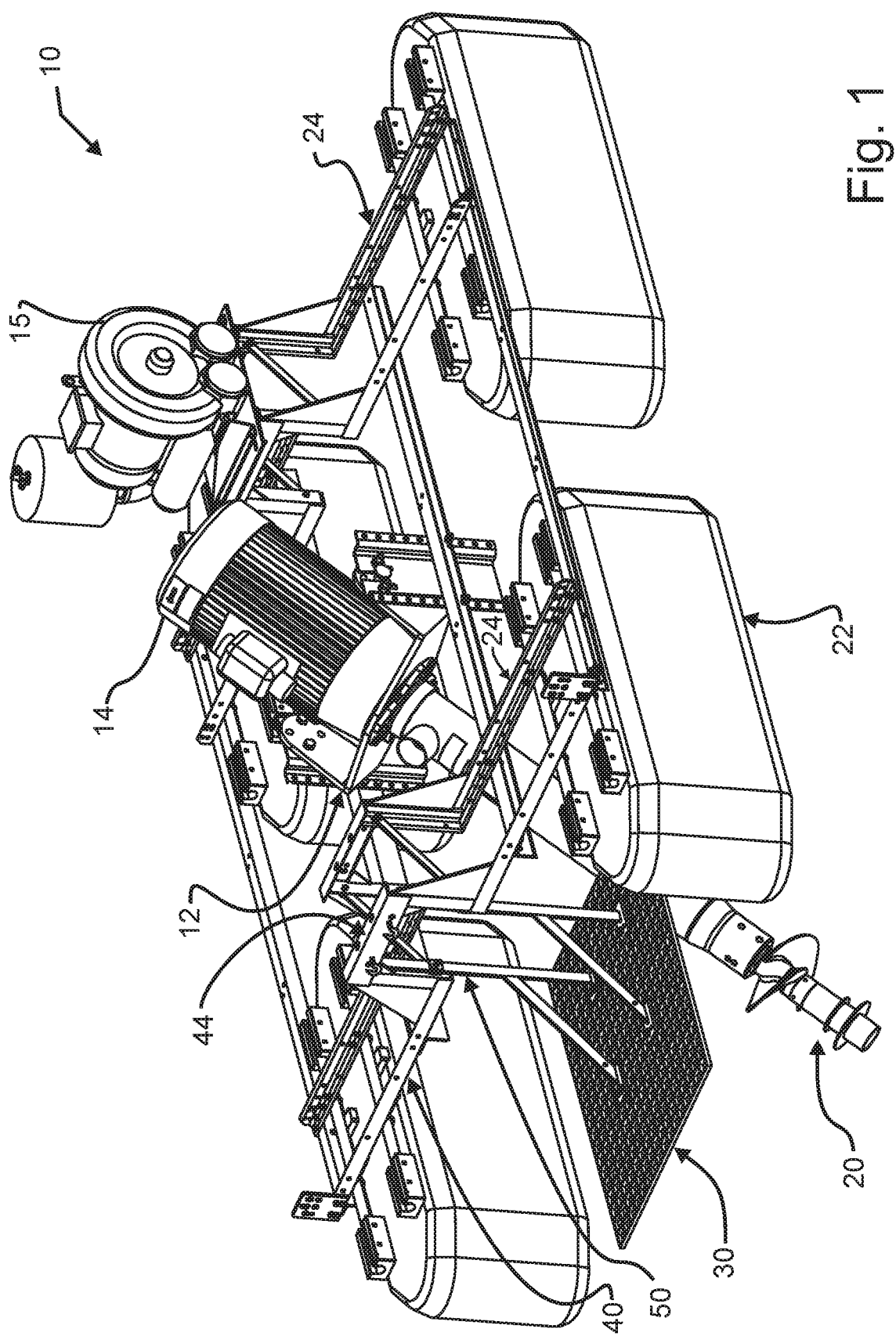
FIGS. 1 and 2 illustrate a preferred embodiment pivotal rigid vortex shield designed in accord with the teachings of the present invention from different isometric views in further combination with an aeration apparatus.
Figure 2:
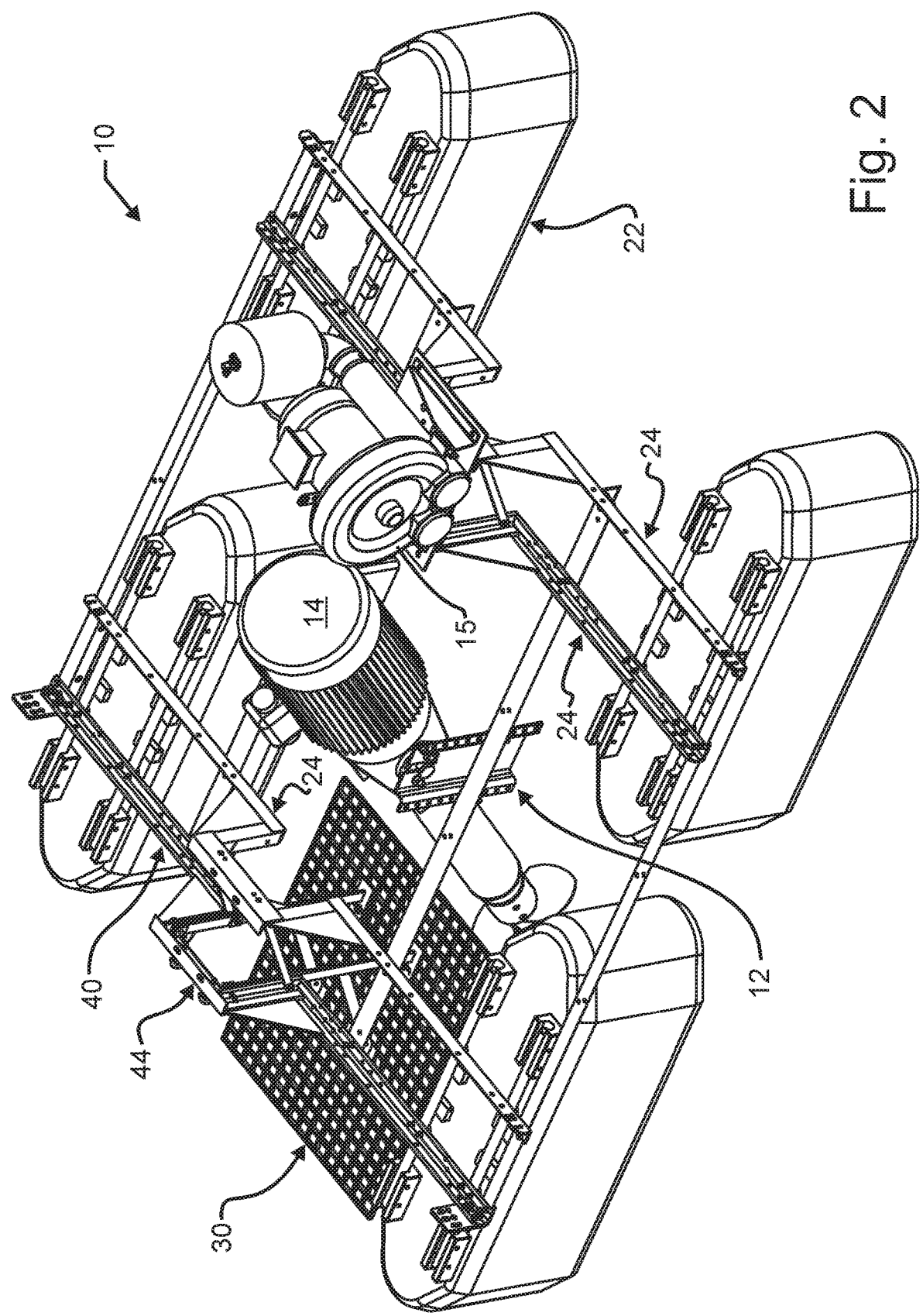

A preferred embodiment of the invention is illustrated in FIGS. 1-4, wherein like numerals indicate like elements. As illustrated in FIGS. 1 and 2, a preferred embodiment pivotal rigid vortex shield 30 is located between propeller 20 and the surface of the liquid being treated, and is designed and configured to prevent the formation of vortices that would otherwise be created by a propeller-type aerator 10 and extend to the liquid surface.

Aerator 10 comprises a motor 14 drivingly coupled to propeller 20. When motor 14 rotates, propeller 20 drives the liquid surrounding it. A blower 15 may be provided to drive air or other suitable gas or treatment fluid down aerator 10 and into the liquid, though in an alternative embodiment the air may be aspirated into the liquid. For exemplary purposes only, and not solely limiting thereto, suitable aerators are illustrated in the Inhofer et al, Durda et al, Schiller, Schurz, and Durda patents incorporated by reference herein above. Aerator 10 is attached to a support system 12.

Support system 12 is for exemplary and non-limiting purposes a floatation type system wherein a plurality of floats 22 float on the liquid being aerated. Floats 22 function as vertical supports, i.e., providing support vertically above the surface of the liquid. Horizontal support bars 24 extend horizontally between floats 22 to function as a first horizontal support. Aerator 10 may be at a desired horizontal location, preferably centrally between floats 22.

In alternative embodiments, a bridge or wall mount may be used to provide support, again for exemplary purposes such as illustrated in U.S. Pat. No. 4,741,825 by Schiller, incorporated by reference herein above, and U.S. Pat. No. 9,675,942 by List et al, entitled "Universal bridge and wall mounted aeration apparatus" commonly owned by the present assignee, the teachings and content which are incorporated herein by reference.

A specially configured horizontal support bar 40 also extends horizontally between floats 22 and functions as a horizontal support for preferred embodiment pivotal rigid vortex shield 30. Another pair of vertical support bars 50 extend perpendicularly from horizontal support bar 40 to function as a vertical support, which in combination with horizontal support bar 40 positions preferred embodiment pivotal rigid vortex shield 30 at a desired location over propeller 20.

Propeller-type aerators can range in size, for exemplary and non-limiting purpose from ½ hp to 100 hp. As the size of the aerator increases, the size of the support system 12 will typically increase in similar proportion. The type of support system 12 also depends on the type and size of the aerated substance container (e.g., basin, lagoon, tank, lake, or other body of liquid). In the preferred embodiment, support system 12 used in combination with vortex shield 30 will comprise a modified version of a prior art basic aerator support system.

Figure 3:
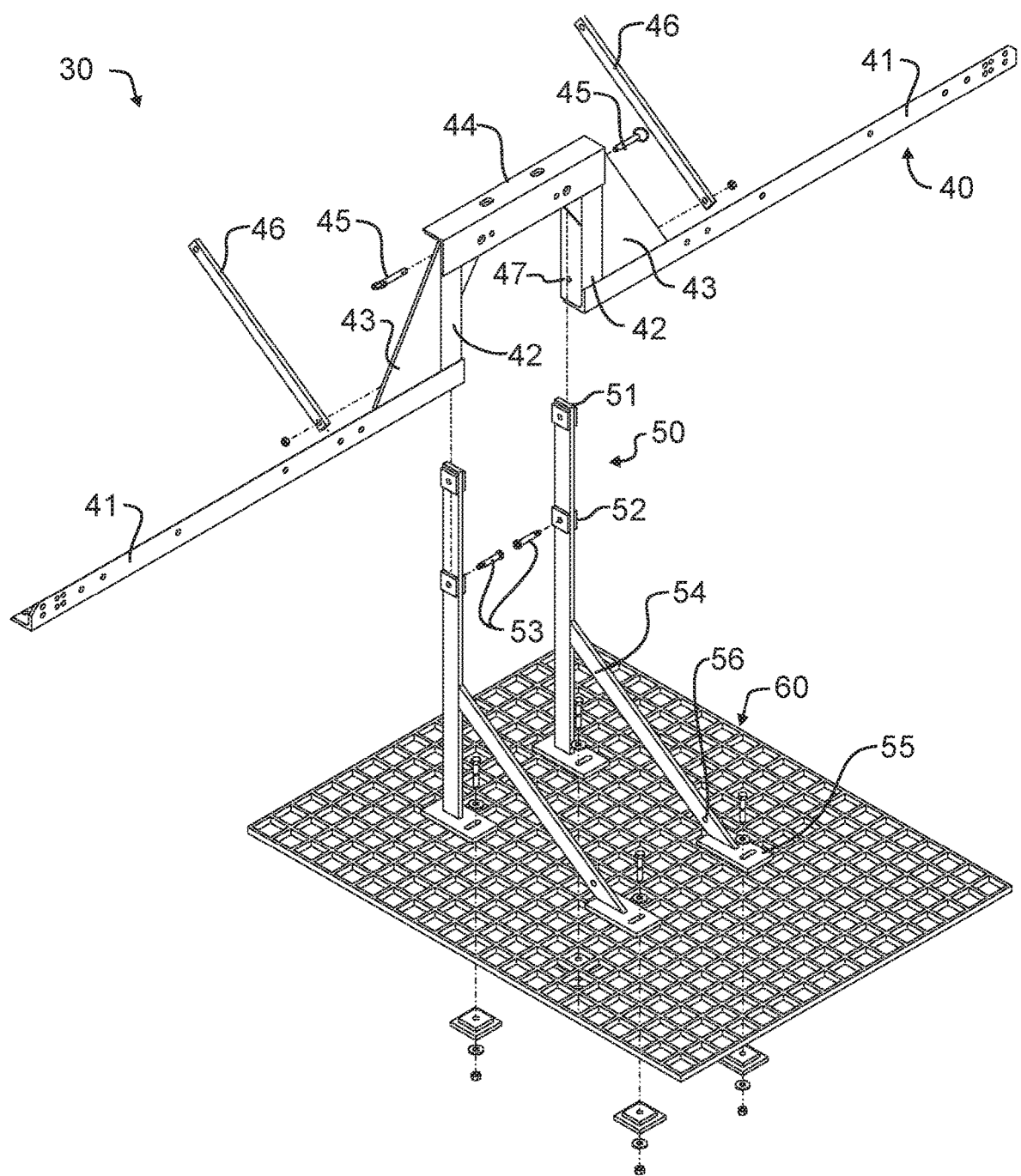
FIG. 3 illustrates the preferred embodiment pivotal rigid vortex shield of FIGS. 1 and 2 from a partially exploded view.
Figure 4:
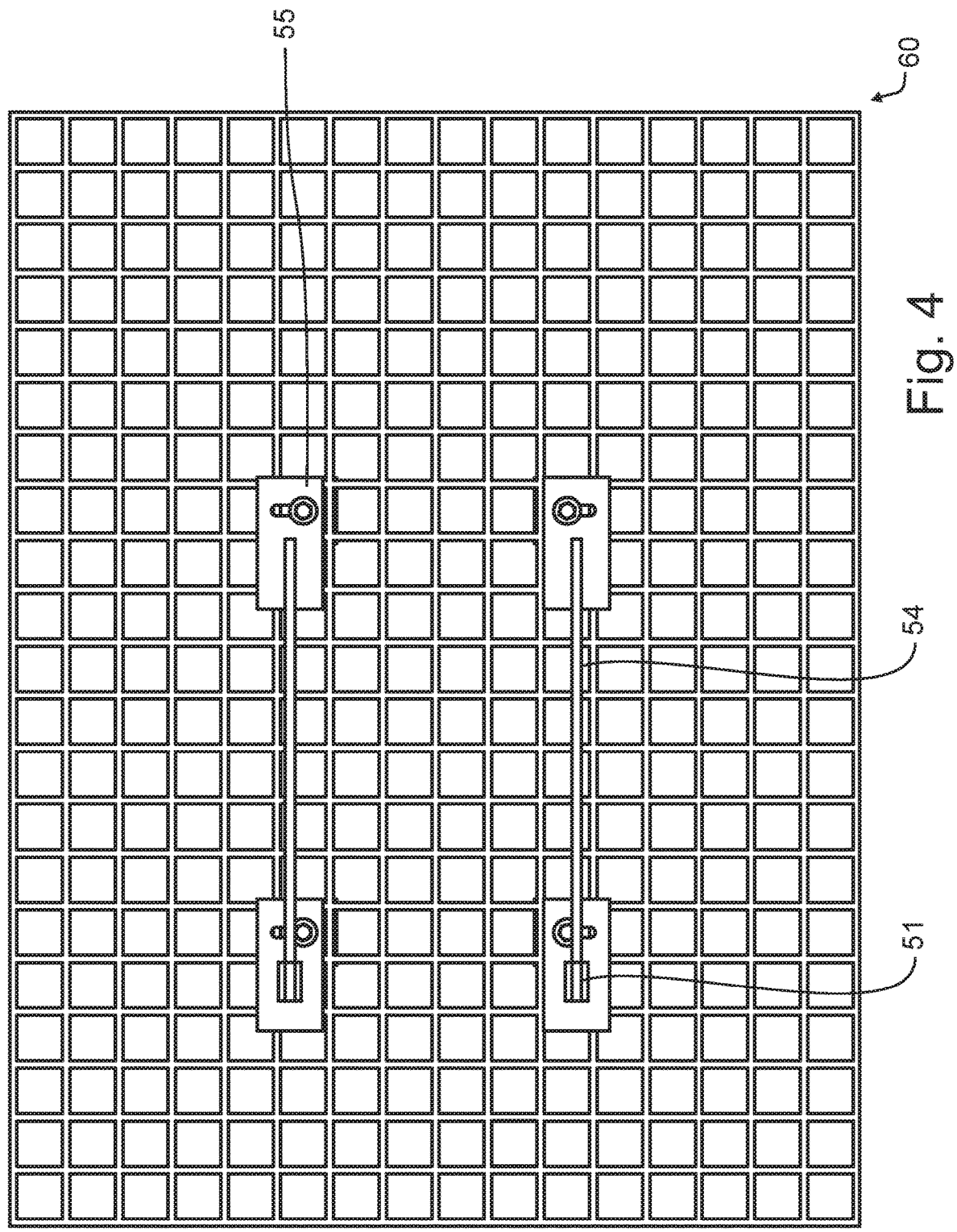
FIG. 4 illustrates the preferred embodiment pivotal rigid vortex shield of FIGS. 1 and 2 from a top view, with the horizontal support bar removed for illustrative purposes.

Preferred embodiment pivotal rigid vortex shield 30, illustrated by a partially exploded view in FIG. 3 and from top view in FIG. 4, is comprised of a pair of vertical support bars 50, and a grate 60. Vertical support bars 50 couple into horizontal support bar 40, that in turn has a pair of cross arches 41 that couple from floats 22 to a pair of vertical pivot and locking members 42. A pair of cross braces 46 may optionally be provided to couple with an adjacent horizontal support bar 24, for added strength and rigidity.

Intermediate between vertical pivot and locking members 42 is a top arch 44. An optional pair of reinforcing plates 43 may be provided to increase the strength of vertical pivot and locking members 42 and top arch 44. A pair of quick release pins 45 serve as a selective lock that may be selectively passed through or removed from vertical pivot and locking members 42. In addition, a pair of pivot holes 47 are provided.

Vertical support bars 50 are provided at a first end with a pair of quick release pin guides 51. At a second end distal to quick release pin guides 51 there are a plurality of coupling feet 55 that are configured to securely engage with vortex destroying grate 60. A pair of angle braces 54 may optionally be provided that augment the strength of connection between vertical support bars 50 and grate 60.

Intermediate therebetween are a pair of shoulder screw guides 52. A pair of shoulder screws 53 pass through shoulder screw guides 52 and into pivot holes 47. While shoulder screws are preferred, it will be understood that in alternative embodiments other pintles may be provided. For exemplary purposes, either one or both of shoulder screw guides 52 and pivot holes 47 may not pass entirely through their associated structures, and may instead pass only partially through. In such instances, hardware other than shoulder screws 53 will be provided.

The pair of shoulder screws 53 define a vortex shield pivot axis and pintle about which vertical support bars 50 and grate 60 will selectively and operatively pivot. The selection of whether vertical support bars 50 and grate 60 will pivot is determined by whether quick release pins 45 pass through or at least partially into vertical pivot and locking members 42 and quick release pin guides 51, or are removed therefrom. When quick release pins 45 pass through, vertical support bars 50 are held parallel to vertical pivot and locking members 42. When quick release pins 45 are removed, then vertical support bars 50 and grate 60 are free to pivot about shoulder screws 53 and so may be rotated about the vortex shield pivot axis. Thus the placement of quick release pins 45 serves as a selective lock that in an operational configuration prevents a rotation of the vortex destroying body about the pivotal axis and that in a service configuration permits the vortex destroying body to rotate about the pivotal axis.

While in nearly all instances, the use of quick release pins 45 as a selective lock is most preferred, it will be appreciated that in some limited instances the weight of grate 60 and relative density of grate 60 relative to the liquid being treated may be sufficient to hold grate 60 in an operational position without the use of quick release pins.

Since grate 60 may be quite heavy and difficult to control, an optional lift cable coupling hole 56 may be provided to which a cable may be connected. The cable may, for exemplary and non-limiting purposes, be connected to a winch or crane, and may be used to lift grate 60 out of the liquid subsequent to removal of quick release pins 45. Once lifted, grate 60 may be inspected, cleaned, or otherwise serviced as desired or required.

While grate 60 is illustrated in the preferred embodiment as an open, generally planar grate, in an alternative embodiment grate 60 may be replaced with a solid sheet. In further embodiments, different perforations or even other non-planar geometries may be provided than those illustrated in the Figures.

Preferred embodiment vortex shield 30 will for most applications either intrinsically or through suitable coatings or treatments preferably be chemically inert, biologically non-degradable and insoluble in the substance being aerated. In yet another alternative embodiment, preferred embodiment vortex shield 30 may be further provided with a treatment, coating, finish, composition, or other suitable arrangement that supports suitable biological growth to maintain a biofilm that further facilitates liquid treatment.

In one alternative embodiment, a semi-rigid or rigid link may be provided that extends vertically from at least one of angle braces 54 to a location above the anticipated liquid level. Such location could be a suitable anchor point anywhere within support system 12 or support bar 40, or even a float or other suitable apparatus. In such instance, the link may provide the coupling to which a cable may be attached, and thereby facilitate the coupling of a cable to angle brace 54 without the need for draining of the lagoon or stepping or reaching into the liquid.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. In combination, a propeller-type aerator and a pivotal rigid vortex shield, said propeller-type aerator having:
    a propeller adapted to impel a liquid;
        a motor driving said propeller;
        a gas source configured to introduce a gas into said liquid; and
        a support system configured to support at least said motor and said propeller relative to said liquid;
    said pivotal rigid vortex shield comprising:
        a vortex destroying body;
        a support affixing said vortex destroying body to said support system;
        a pivotal axis about which said support and said vortex destroying body are configured to rotate; and
        at least one selective lock having an operational configuration preventing a rotation of said vortex destroying body about said pivotal axis and having a service configuration permitting said vortex destroying body to rotate about said pivotal axis.

2. The combination propeller-type aerator and pivotal rigid vortex shield of claim 1, wherein said vortex destroying body further comprises a generally planar sheet which in an operational configuration is generally parallel to a surface of a liquid being treated.

3. The combination propeller-type aerator and pivotal rigid vortex shield of claim 1, wherein said support affixing said vortex destroying body to said support system further comprises:
    a horizontal support bar comprising at least two cross arches;
    at least one vertical pivot and locking member affixed to at least one of said at least two cross arches.

4. The combination propeller-type aerator and pivotal rigid vortex shield of claim 3, wherein said at least one vertical pivot and locking member further comprises:
    a first vertical pivot and locking member;
    a second vertical pivot and locking member; and
    a top arch affixed on a first position to said first vertical pivot and locking member and on a second position distal to said first position to said second vertical pivot and locking member.

5. The combination propeller-type aerator and pivotal rigid vortex shield of claim 3, wherein said pivotal axis is defined by a pintle, said pintle coupling said at least one vertical pivot and locking member to said vortex destroying body, and further comprising at least one quick release pin configured to selectively simultaneously pass through at least a portion of said at least one vertical pivot and locking member and at least a portion of said vortex destroying body to thereby prevent rotation of said vortex destroying body about said pintle.

6. The combination propeller-type aerator and pivotal rigid vortex shield of claim 5, wherein said at least one quick release pin is configured in a service configuration to permit said vortex destroying body to rotate about said pintle.

7. The combination propeller-type aerator and pivotal rigid vortex shield of claim 4, further comprising:
    a coupling affixing said horizontal support bar at distal ends to said support system; and
    at least one cross brace intermediate between said horizontal support bar distal ends and extending between said support and said support system.

8. The combination propeller-type aerator and pivotal rigid vortex shield of claim 1, wherein said vortex destroying body further comprises a grate.

9. The combination propeller-type aerator and pivotal rigid vortex shield of claim 1, wherein said vortex destroying body and said support affixing said vortex destroying body to said support system are each rigid.

10. The combination propeller-type aerator and pivotal rigid vortex shield of claim 5, wherein said pintle further comprises:
    at least one pivot hole passing at least partially through said at least one vertical pivot and locking member;
    at least one shoulder screw guide passing at least partially through said vortex destroying body support; and
    at least one shoulder screw located within each of said at least one pivot hole and at least one shoulder screw guide.

11. A pivotal rigid vortex shield supported upon a supporting apparatus, comprising:

a vortex destroying body having a rigid, generally planar grate which in an operational configuration is generally parallel to a surface of a liquid being treated;

a support affixing said vortex destroying body to said supporting apparatus, said support having
- a horizontal support bar comprising at least two cross arches and
- at least one vertical pivot and locking member affixed to at least one of said at least two cross arches; and a pintle about which said vortex destroying body is configured to rotate relative to said support.

12. The pivotal rigid vortex shield of claim 11, wherein said at least one vertical pivot and locking member further comprises:
- a first vertical pivot and locking member;
- a second vertical pivot and locking member; and
- a top arch affixed on a first position to said first vertical pivot and locking member and on a second position distal to said first position to said second vertical pivot and locking member.

13. The pivotal rigid vortex shield of claim 11, wherein said pintle couples said at least one vertical pivot and locking member to said vortex destroying body, and further comprising at least one quick release pin configured in an operational configuration to selectively simultaneously pass through at least a portion of said at least one vertical pivot and locking member and at least a portion of said vortex destroying body to thereby prevent rotation of said vortex destroying body about said pintle.

14. The pivotal rigid vortex shield of claim 13, wherein said at least one quick release pin is configured in a service configuration to permit said vortex destroying body to rotate about said pintle.

15. In combination, a propeller-type aerator and a pivotal rigid vortex shield, said propeller-type aerator having:
- a propeller adapted to impel a liquid;
- a motor driving said propeller;
- an air source configured to introduce air into said liquid; and
- a support system configured to support at least said motor and said propeller relative to said liquid;

said pivotal rigid vortex shield comprising:
- a rigid, generally planar vortex destroying body;
- a support affixing said vortex destroying body to said support system, said support having a horizontal support bar comprising at least two cross arches and at least one vertical pivot and locking member affixed to at least one of said at least two cross arches;
- said at least one vertical pivot and locking member having a first vertical pivot and locking member, a second vertical pivot and locking member, and a top arch affixed on a first position to said first vertical pivot and locking member and on a second position distal to said first position to said second vertical pivot and locking member;
- a pintle defining a pivotal axis about which said support and said vortex destroying body are configured to rotate; and
- at least one selective lock having an operational configuration preventing a rotation of said vortex destroying body about said pivotal axis and having a service configuration permitting said vortex destroying body to rotate about said pivotal axis.

16. The combination propeller-type aerator and pivotal rigid vortex shield of claim 15, wherein said at least one selective lock further comprises at least one quick release pin that is configured in said operational configuration to simultaneously pass through at least a portion of said at least one vertical pivot and locking member and at least a portion of said vortex destroying body support to thereby prevent rotation of said vortex destroying body about said pintle.

* * * * *